United States Patent [19]

Goff

[11] 3,870,339
[45] Mar. 11, 1975

[54] MULTI-PURPOSE TANDEM TRAILER
[75] Inventor: Jerry J. Goff, Fortville, Ind.
[73] Assignee: Samuel Dowden, Ingalls, Ind.; a part interest
[22] Filed: May 22, 1974
[21] Appl. No.: 472,119

[52] U.S. Cl. ............ 280/414 R, 214/512, 296/23 B
[51] Int. Cl. .............................................. B60p 3/10
[58] Field of Search........ 280/414 R, 5 F; 296/23 B, 296/1 A; 214/512

[56] References Cited
UNITED STATES PATENTS

| | | | |
|---|---|---|---|
| 2,358,537 | 9/1944 | Rose | 280/5 F |
| 2,847,136 | 8/1958 | Neff | 280/414 X |
| 3,449,010 | 6/1969 | Hoy | 296/1 A |
| 3,486,786 | 12/1969 | Howarth | 296/23 B |
| 3,718,227 | 2/1973 | Swift | 214/512 |

Primary Examiner—Leo Friaglia
Attorney, Agent, or Firm—Woodard, Weikart, Emhardt & Naughton

[57] ABSTRACT

A multi-purpose tandem trailer having utility for transporting and storing two or more boats, for transporting or storing a camper top and a boat, for transporting a plurality of motorcycles, or for carrying luggage or other bulky items. The trailer comprises two support structures, the first support structure having wheels mounted thereon and having means for connecting said first support structure with a pulling or towing vehicle. The second support structure is similar to the first support structure with the significant exception of being movable through a plurality of fixed positions in a vertical plane. The adjustability of the second support structure allows the tandem trailer to be aerodynamically stable when being pulled even at high speeds.

20 Claims, 8 Drawing Figures

PATENTED MAR 11 1975 3,870,339

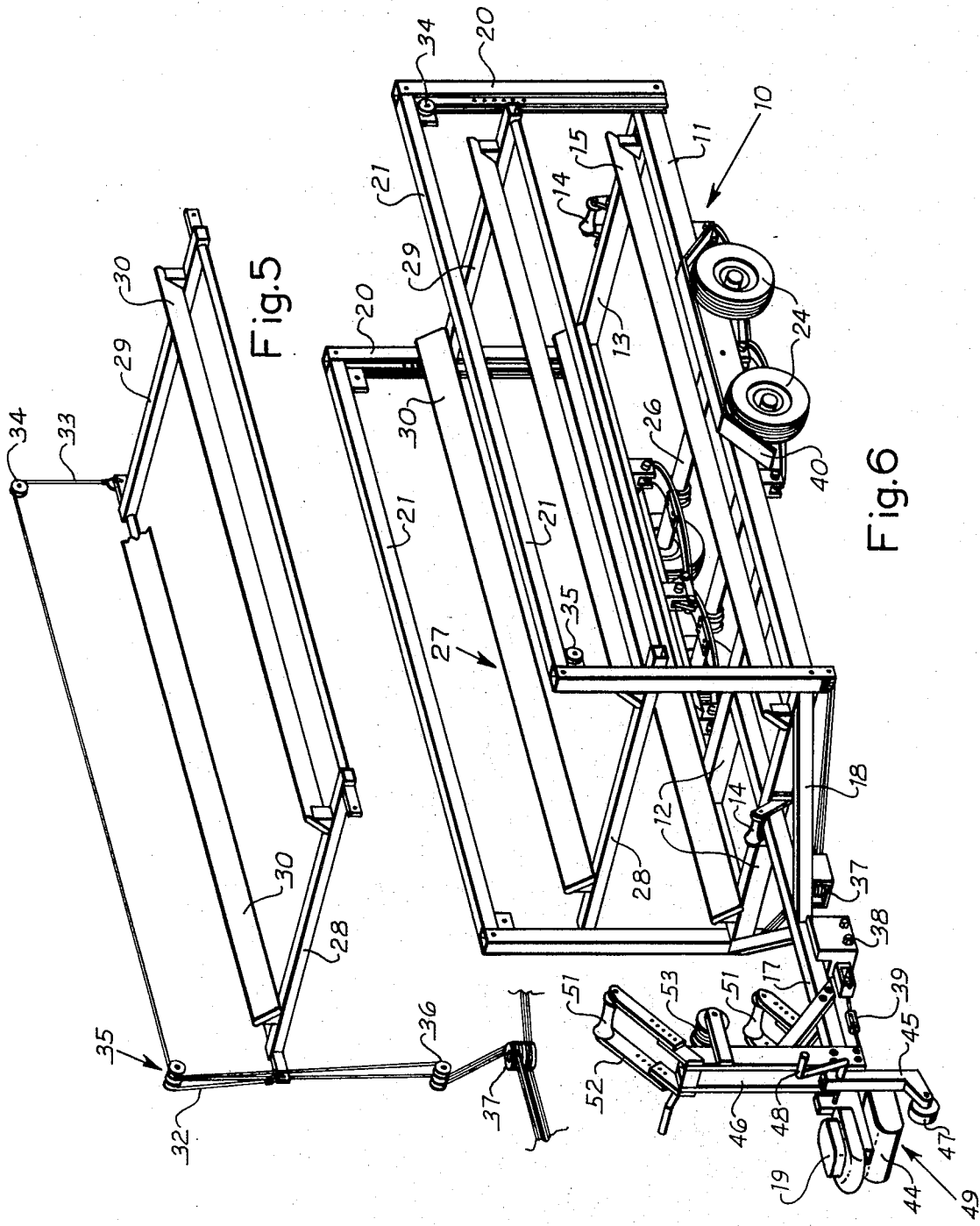

MULTI-PURPOSE TANDEM TRAILER

BACKGROUND OF THE INVENTION

1. Field of the Invention

This invention relates to vehicle attached auxiliary carriers which are movable to provide a loading ramp and which have an elevated loading body.

2. Description of the Prior Art

Conventional trailers, such as boat, utility and dog trailers, are well known and have been used extensively in the past. These trailers, however, are usually separate trailers permanently attached to running gears and therefore serving only a single purpose. To reduce the cost of a plurality of such single-purpose trailers and to make the trailers functionally more useful, various attempts have been made to provide combination trailers which may be used for more than one purpose. Examples of known prior art attempts are illustrated in May, U.S. Pat. No. 3,578,190 (1971), Swift, U.S. Pat. No. 3,718,227 (1973), and Bledsoe, U.S. Pat. No. 3,649,064 (1972).

In each of these patents, the article being carried on the trailer must be moved before conversion of the trailer for another use. Since it is becoming the usual practice and often highly desirable to store many articles, especially boats, on a single trailer these known combination trailers have limited utility. Furthermore, it is desirable to provide a trailer body which may be itself converted for various specific used.

There has been and still remains an increasing demand among outdoorsmen of various types, especially fisherman and hunters, for a multi-purpose trailer which will allow, for example, a fisherman to carry a variety of boats to allow him access to various types of water, i.e. streams, lakes, ponds, rivers, under a variety of weather conditions; hunters who may wish to carry a boat and still have a suitable carrier for any of the various big game which they may shoot or capture. By the same token, hunters may want to carry a boat and have a cage for hunting dogs. Up to this time, these various needs have not been satisfied by a single trailer unit. However, with my invention all of these desires may be accomplished with a single basic multi-purpose tandem trailer unit.

SUMMARY OF THE INVENTION

This invention relates to a tandem multi-purpose trailer for transporting and storing at least two articles such as boats comprising a first support structure, said first support structure having means mounted thereon for carrying and securing a boat in a fixed position; a second support structure, said second support structure being movable from a lower position immediately above said first support structure to a raised position of from about three inches to about seven feet above said lower position, said second support structure having means for carrying and securing a boat in a fixed position, a plurality of vertical guide members, said guide members having means for allowing said second support structure to move from said lower position to said raised position; means for raising and lowering said second support structure along said guide members; and a third support structure, said third support structure connecting said first support structure to the vehicle pulling the trailer, said third support structure having a mounted thereon means fixedly attaching said trailer to said vehicle.

Therefore, it is an object of this invention to provide a multi-purpose tandem trailer on which two boats may be securely fastened for transport or storage.

It is a further object of this invention to provide a multi-purpose tandem trailer which may be converted from a two-boat trailer into a trailer having a camper and a boat mounted thereon.

It is further object of this invention to provide a multi-purpose tandem trailer on which a second support structure is movable through a plurality of fixed positions.

It is an additional object of this invention to provide a multi-purpose tandem trailer which is aerodynamically stable when being pulled by conventional vehicles.

These and other objects of this invention will become apparent from the following description of the preferred embodiment.

BRIEF DESCRIPTION OF THE DRAWINGS

FIG. 5 is a partial view of the cabling with support members removed.

FIG. 6 is a perspective view of the entire structure.

DESCRIPTION OF THE PREFERRED EMBODIMENT

Figure 1:
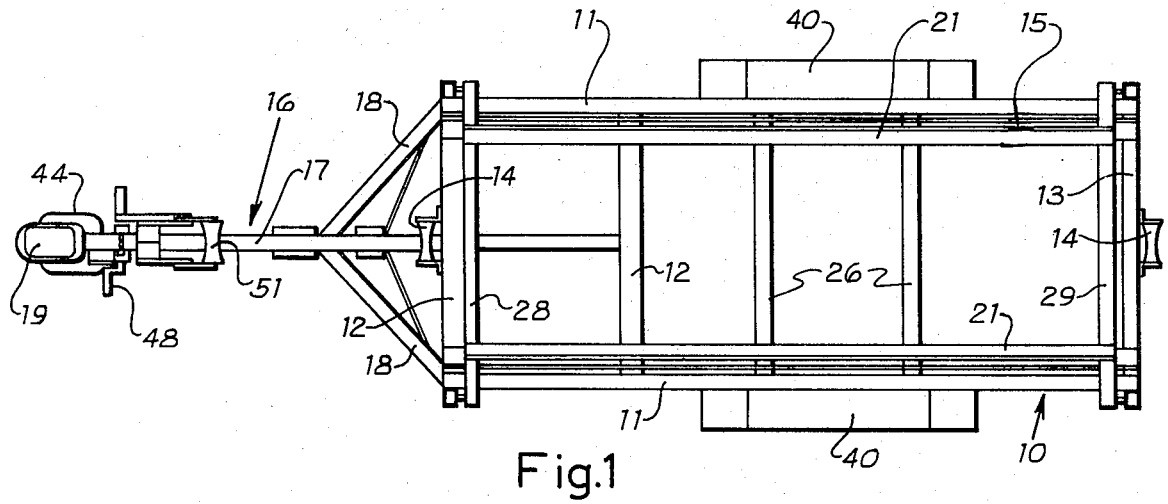
FIG. 1 is a top view of the assembled structure.
Figure 2:
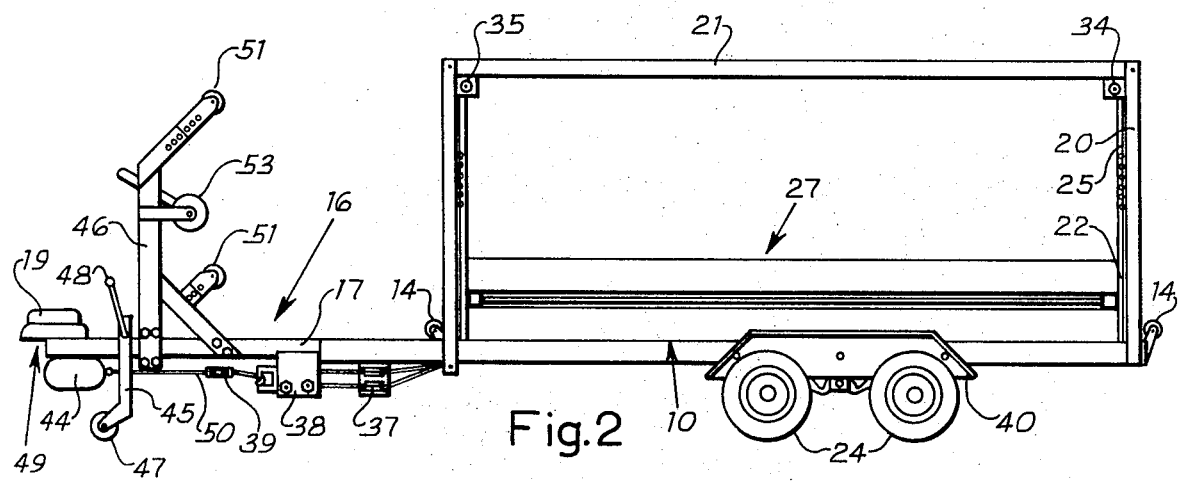
FIG. 2 is a side view of the assembled structure.
Figures 3, 4:
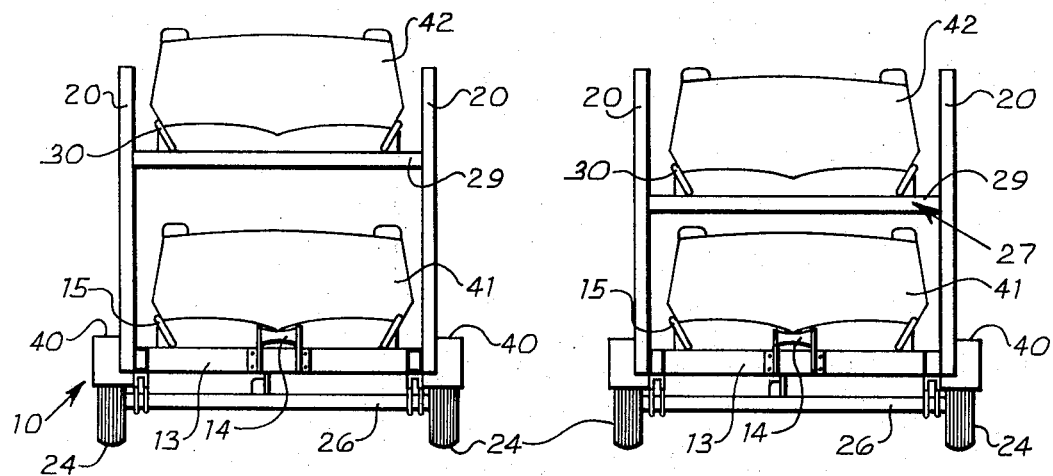
FIG. 3 is a rear view of the assembled structure in load position for the lower boat.
FIG. 4 is a rear view of the assembled structure in travel position with the top boat lowered.
Figure 7:
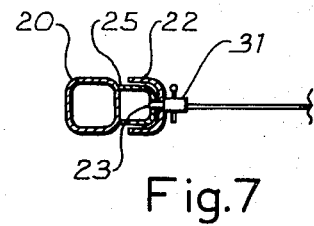
FIG. 7 is a top view of a cross section of one of the guide members.
Figure 8:
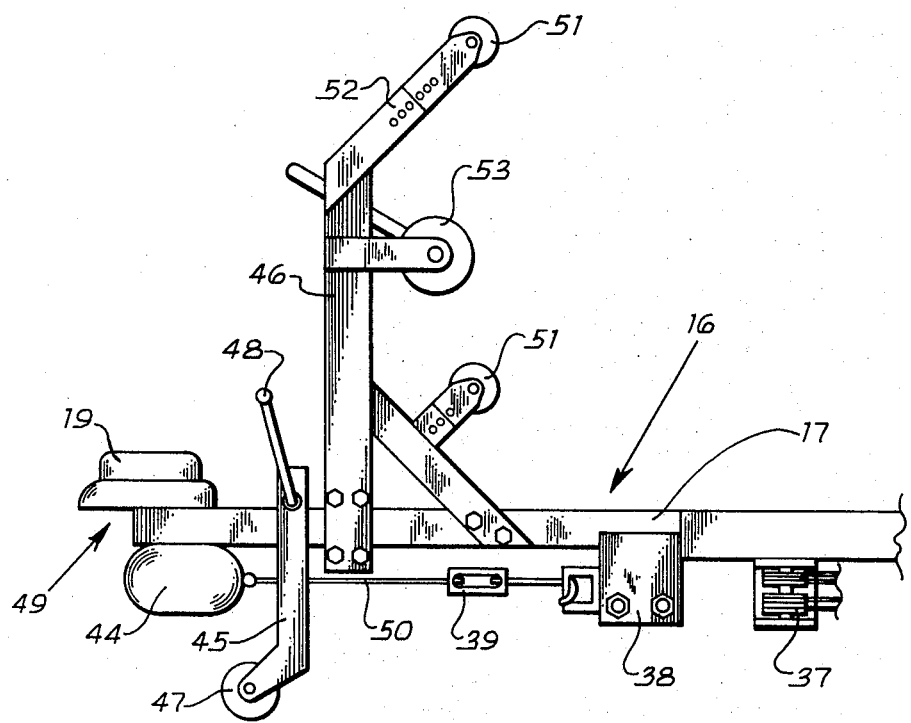
FIG. 8 is a partial view of the tongue assembly.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and further applications of the principles of the invention as illustrated therein being contemplated as would normally occur to one skilled in the art to which the invention relates.

The first support structure 10 comprises the support elements normally found in a boat trailer. Namely side support members 11, front support members 12 and rear support member 13 are used to support the boat or other item to be carried. At the same time, the wheels 24 are mounted on axles 26 which in turn are connected to said first support structure 10. Optionally, wheel guards 40 may be provided for added protection, convenience, strength and appearance. Also a brake system may be provided depending on the load to be carried and state trailer regulations. The structural members are preferably made fromm metal tubing which is 3 inches by 2 inches having a thickness rating of 120. This tubing is, however, not critical to the invention and may be varied depending upon the load or type of load which is ultimately to be carried by the trailer. For the purposes of illustration, the tandem trailer described herein will be such as would be used to carry a pair of boats. However, it should be understood that this basic trailer unit may be conveniently modified to allow other optional equipment to be added. The boat 41 is guided onto the first support structure 10 by means of rollers 14. Once in place, the boat 41 is held stationary by the boards 15. Boards 15 are specifically designed so as not to damage the boats while being stored or transported. Boards 15 are adjustable both horizontally and vertically. Optionally, the first support structure 10 can be mounted on said wheels 24 and axles 26 such that it can be adjusted from a forward to a rear position, thus allowing the user to effectively balance the weight over the wheels regardless of the load.

The tongue assembly 16 connects the first support structure 10 to the pulling vehicle. The primary structural member of the third support structure 16 is the tongue 17. Tongue 17 may be made as long or as short as is desired depending upon the size of the load which is intended to be carried. In addition, tongue 17 may be telescoped to facilitate ease of entrance and exit from the water. Telescopically received within the tongue 17 may be extension member (not shown in the drawing). The extension may be provided with a plurality of horizontal apertures for receiving a pin inserted through an aligned aperture in the tongue 17. The position of the extension member within the tongue 17 may thus be adjusted thereby adjusting the length of the tongue. At the frontmost end 49 of the tongue assembly 16 there is mounted a connector 19. This connector may be the familiar ball and socket joint as is shown or may be any of a number of other well-known means for connecting a trailer to a vehicle. The particular type of connecting means is not critical and may be varied to suit the individual pulling vehicle or the size or configuration of the load being pulled. The tongue 17 is connected to the first support structure 10 by triangular support structures 18.

Also mounted on the tongue assembly 16 are a support wheel assembly 45 and a boat nose support assembly 46. The support wheel assembly 45 comprises a wheel 47 which can be raised and lowered by turning handle 48. The support assembly 46 comprises a pair of rollers 51 on which the noses of the boats may rest, and a pair of adjustable roller support members. Also optionally a hand winch 53 may be mounted on assembly 46.

Four guide members made out of the same material as used to make support members 11, 12 and 13 project from and are connected fixedly to the corners of said first support structure 10. The guide members 20 project in a vertical plane for from about 3 feet to about 7 feet. A runner 25 is attached to each guide member 20 to provide a path for sliding member 22. Runners 25 may be lubricated to provide ease of movement with sliding member 22. Holes 23 are provided in runner 25 to allow member 22 to be fixed in a set position by pressure release pins 31. Connecting the four guide members 20 are guide member support members 21.

The second support structure 27 is very similar to the first support structure 10. Boards 30 is provided which correspond to boards 15 as found on first support structure 10. The boards 30 keep the second support structure 27 in proper alignment allowing proper movement of sliding members 22. Boards 30 are adjustable both horizontally and vertically. Structurally, the second support structure 27 comprises a front support member 28 and a back support member 29 which are made from the same material as are support members 11, 12 and 13 of said first support structure.

The actual means for raising and lowering the second support structure 27 with or without a second boat 42 or other item may be varied according to individual needs. Sample types of means are hydraulic means, cable means, cable-winch means and cable-hand means. The preferred method for raising and lowering support structure 27 is by means of cable-pulley-winch setup. Specifically, two cables 32 are attached to said front support member 28. Two additional cables 33 are attached to back support member 29. Preferably 3/16 inch aircraft cable is used. Cables 33 are aligned through single pulleys 34 mounted at the intersection of rear guide members 20 and the guide member support members 21. The cables 33 then run inside guide member support members 21 to the front of the trailer unit. Two cables 32 are attached as mentioned supra and run up front guide members 20 and around a tandem-pulley setup 35 at the intersection of both of said front guide members 20 and the guide member support members 21. At this point, there are four cables two of which run down the inside of each of the front guide members 20. There are two cables 33 from back support member 29 via individual pulleys 34 and there are two cables 33 which come from front support member 28 via tandem pulley 35. At tandem pulleys 35, all four cables are guided into the front guide members 20 and down to a second set of tandem pulleys 36 on the bottommost surface of said first support structure 10. All four cables are then threaded forward where they are guided by a double tandem pulley arrangement 37 mounted on the bottommost surface of tongue 17. The four cables then lead out of the double tandem pulley 37 into a three-point hitch 38 wherein the four lines are transformed into a single line 50 which in turn leads to winch 44. A block and tackle assembly 39 is used to attach the winch 44 to the hitch 38.

Winch 44 can be any of the commonly known and commercially available winch arrangements. An especially preferred winch is a single line winch by Universal Bosch, having 4000 pounds of pull and 1500 pounds of lift. These dimensions are, of course, not critical and may be varied depending upon the load to be pulled or lifted. By operation of the winch 44, the second support structure 27 may be raised or lowered. As the winch 44 is operated the second support structure 27 can be raised or lowered by movement of sliding member 22 along runner 25 which is attached to guide member 20. As mentioned previously, the holes 23 in runners 25 are provided so that the second support structure 27 may be locked in any of a plurality of raised positions. The locking pins 31 are simply pressure release pins which fit into the holes 23 to provide support for support structure 27 when in the fixed position.

If two boats are desired to be carried, the standard procedure for loading the boats would be to load the boat 42 onto the second support structure 27 while said support structure 27 was in the lowermost position. After boat 42 has been secured, boat 42 as held by support structure 27 would be raised to the maximum raised position. Then boat 41 would be pulled onto the first support structure 10. Boat 41 would be secured as normally would be done for transporting boats. Then, to provide maximum aerodynamic stability, boat 42, the boat which was in the raised position, is lowered until it is as close as is possible to the top of the second boat. This allows a more compact tandem trailer which is more convenient for transportation due to various windage problems.

Although there are virtually unlimited numbers of modifications which can be made to this multi-purpose tandem trailer unit, a few preferred embodiments are a tandem trailer for hauling two boats as has been generally described. A second embodiment would be a camper mounted on the second support structure 27 with a boat loaded onto the first support structure 10. A third embodiment would be mounting a dog cage to transport hunting dogs on either the first or second support structure and a boat on the other support structure. A fourth embodiment would involve the transport of a plurality of motorcycles, such as six, wherein several could be mounted on both the upper and lower supporting structures. These are but a few of the many embodiments which can be used for this invention. However, in all embodiments an additional piece of equipment would be a luggage carrier.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention in the scope of the claims are also desired to be protected.

The invention claimed is:

1. A tandem multi-purpose trailer for transporting and storing at least two boats comprising:
   a. a first support structure, said first support structure having means mounted thereon for carrying and securing a boat in a fixed position;
   b. a second support structure, said second support structure being movable from a lower position immediately above said first support structure to a raised position of from about 3 inches to about 7 feet above said lower position, said second support structure having means for carrying and securing a boat in a fixed position;
   c. a plurality of vertical guide members, said guide members having means for allowing said second support structure to move from said lower position to said raised position;
   d. means for raising and lowering said second support structure along said guide members; and
   e. a tongue assembly, said tongue assembly connecting said first support structure to the vehicle pulling the trailer, said tongue assembly having mounted thereon means for fixedly attaching said trailer to said vehicle.

2. The mulit-purpose trailer of claim 1 wherein said first support structure has a plurality of wheels mounted thereon.

3. The tandem multi-purpose trailer of claim 1 wherein said trailer has a separate brake system.

4. The tandem multi-purpose trailer of claim 3 wherein said brake system is an electric brake system.

5. The tandem multi-purpose trailer of claim 3 wherein said brake system is a hydraulic brake system.

6. The tandem multi-purpose vehicle of claim 1 wherein said means for carrying and securing a boat in a fixed position comprise:
   a. a plurality of guide wheels in the center of said first support structure, and
   b. a pair of boards for securing said boat in proper alignment during loading and traveling.

7. The tandem multi-purpose trailer of claim 1 wherein said means for raising and lowering said second support structure is a winch.

8. The tandem multi-purpose trailer of claim 7 wherein said winch is mounted underneath the frontmost end of said tongue assembly.

9. The tandem multi-purpose trailer of claim 1 wherein said guide members contain a plurality of holes at intervals of from about 2 inches to about 6 inches whereby said second support structure can be locked in a plurality of raised positions between said lower position and the maximum raised position.

10. The tandem multi-purpose trailer of claim 1 wherein said guide members have runners attached thereto, said runners being receptive to sliding members mounted on said second support structures.

11. The tandem multi-purpose trailer of claim 1 wherein said tongue assembly is telescoped so as to be lockable in an extended position, a shortened position or any position in between in order to facilitate convenient entrance and exit from water.

12. The tandem multi-purpose trailer of claim 1 wherein said first support structure is adjustable 13. The tandem multi-purpose trailer of claim 1 wherein a camper is mounted on said second support structure.

14. A tandem multi-purpose trailer for transporting and storing at least two boats comprising:
   a. a first support structure, said first support structure having means mounted thereon for carrying and securing a boat in a fixed position; said first support structure being mounted on a plurality of wheels, said wheels having a hydraulic brake system;
   b. a second support structure, said second support structure being movable from a lower position immediately above said first support member to a plurality of raised positions, each of said raised positions being from about 2 inches to about 6 inches higher than the preceding raised position, the maximum raised, position being from about 3 feet to about 7 feet above said lower position, said second support structure having means for carrying and securing a boat in a fixed position;
   c. a plurality of vertical guide members, said guide members having means for allowing said second support structure to move from said lower position, through all said raised positions to the maximum raised position;
   d. a tongue assembly, said tongue assembly connecting said first support structure to the vehicle pulling said trailer, said tongue assembly having mounted thereon means for fixedly attaching said trailer to said vehicle; and
   e. winch means for raising and lowering said second support structure along said guide members.

15. The tandem multi-purpose vehicle of claim 14 wherein said means for carrying and securing a boat in a fixed position comprise:
   a. a plurality of guide wheels in the center of said first support structure, and
   b. a pair of boards for securing said boat in proper alignment during loading and traveling.

16. The tandem multi-purpose trailer of claim 14 wherein said guide members have runners attached thereto, said runners being receptive to sliding members mounted on said second support structure.

17. The tandem multi-purpose trailer of claim 14 wherein said tongue assembly is telescoped so as to be lockable in an extended position, a shortened position or any position in between in order to facilitate convenient entrance and exit from water.

18. The tandem multli-purpose trailer of claim 14 wherein said first support structure is adjustable.

19. The tandem multi-purpose trailer of claim 14 wherein a camper is mounted on said second support structure.

20. The tandem multi-purpose trailer of claim 14 wherein a luggage container is mounted on said first support structure.

* * * * *